3,431,247
CHEMICAL PROCESS AND PRODUCTS
Nicolaas Joseph H. Gülpen, Weert, and Hans G. Gerritsen, Deventer, Netherlands, assignors to Koninklijke Industrieele Maatschappij Noury & van der Lande N.V., Deventer, Netherlands, a corporation of the Netherlands
No Drawing. Filed July 20, 1964, Ser. No. 383,985
Claims priority, application Great Britain, July 22, 1963, 28,969/63
U.S. Cl. 260—88.2      4 Claims
Int. Cl. C08f 1/60, 3/02

It is known that ethylenic compounds, and especially ethylene itself, may be polymerized at temperatures from 50°–300° C. and at pressures from 500–3000 kg./cm.$^2$ in the presence of peroxidic initiators, such as dialkyl peroxides, aliphatic diacyl peroxides and both unsaturated and saturated peresters. For an efficient polymerization, however, it is necessary to adjust the polymerization temperature to suit the rate of thermal decomposition of the particular peroxide used. When using very reactive peroxides, such as alpha-substituted unsaturated and saturated diacyl peroxides, as initiators in the polymerization of ethylene at temperatures from 50°–150° C., a polyethylene of medium density is obtained. It is not possible to use these peroxides at higher temperatures as they would then decompose too rapidly.

The use of less reactive peroxides, such as ditertiary-butyl-peroxide, at temperatures of 150°–230° C. has the disadvantage that their decomposition takes place too slowly. Consequently, the polymer obtained contains residual peroxide. This disadvantage arises especially in the continuous polymerization of ethylene.

For the preparation of a polyethylene of low density at temperatures from 150°–230° C., lauroyl peroxide and tert. butyl perbenzoate are commonly used as initiators. However, at these temperatures, the rate of decomposition of lauroyl peroxide is too high, whereas tert. butyl perbenzoate decomposes too slowly.

Consequently, for the preparation of polyethylene of low density, it is desirable to have peroxidic initiators available which decompose completely under the prevailing conditions of temperature (150°–230°) and pressure (at least 500 kg./cm.$^2$) within the time of reaction, but not so rapidly that this decomposition takes place within only a fraction of the time of the reaction.

In accordance with the present invention, it has been discovered that, surprisingly, peroxides of the general formula:

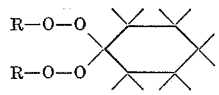

(in which the hydrogen atoms of the cyclohexyl nucleus may be replaced by one or more alkyl or cycloalkyl radicals containing from 1 to 6 carbon atoms or by a group of the formula:

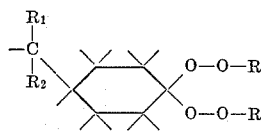

R being a tertiary alkyl or tertiary aralkyl radical and $R_1$ and $R_2$ being the same or different alkyl radicals containing 1 or 2 carbon atoms)

not only meet the requirements stated above, but also have a low thermal and frictional sensitivity. Consequently, the danger of an uncontrolled decomposition while handling these peroxides and feeding them to the reaction zone is decreased very considerably.

The peroxides employed according to the present invention may be obtained by reacting a compound of the general formula:

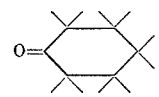

(in which the hydrogen atoms of the cyclohexyl nucleus may be replaced by one or more alkyl or cycloalkyl radicals containing from 1 to 6 carbon atoms or by a group of the formula:

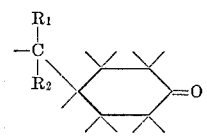

in which $R_1$ and $R_2$ have the same meanings as above) with a tertiary alkyl or tertiary aralkyl hydroperoxide in the presence of an acid-reacting catalyst, the water formed being eliminated from the reaction zone during the reaction.

The peroxide-forming reaction is preferably carried out in benzene at a temperature of 20°–50° C., the water formed being eliminated from the reaction zone during the reaction by azeotropic distillation with benzene under reduced pressure.

The peroxides preferably used in accordance with the present invention for the polymerization of olefines, such as ethylene, propylene, butylene and mixtures thereof, include 1,1-bis-(tertiary-butyl-peroxy)-cyclohexane,
1,1-bis-(tertiary-butyl-peroxy)-3-methylcyclohexane,
1,1 - bis-(tertiary-butyl-peroxy) - 2,5 - dimethylcyclohexane,
1,1-bis-(tertiary-butyl-peroxy)-2-cyclohexylhexane,
2,2 - bis-[4,4 - di-(tertiary-butyl-peroxy)-cyclohexyl]-propane,
1,1 - bis-(tertiary-butyl-peroxy) - 4 - tertiary-butylcyclohexane.

The temperature at which the polymerization takes place with these compounds is dependent upon the desired density of the final product and upon the way in which the polymerization is carried out. For instance, discontinuous polymerization in an autoclave takes place at a lower temperature than polymerization in a zone reactor with a contact time of 2 to 3 minutes.

It is usual to express the rate of thermal decomposition of a peroxide at a definite temperature in terms of the half-life time ($t\frac{1}{2}$). The mathematical relation between the half-life time and the reaction constant of the decomposition reaction, as well as methods for the determination of this constant, are fully described by F. H. Dickey, Ind. Eng. Chem., 41, 1676 (1949)

In the polymerization of ethylenic compounds, the half-life time should be about one-tenth of the total polymerization time.

The present invention is illustrated by the following working example, while in Table I half-life times are given at various temperatures for some peroxides to be used in the process according to the present invention as well as for some reference peroxides. The rates of decomposition are determined in mineral oil as a solvent.

TABLE I

| Peroxide | Half-life time (in seconds) at °C | | | | | |
|---|---|---|---|---|---|---|
| | 75 | 100 | 125 | 150 | 175 | 200 |
| 1,1-bis-(tert. butyl-peroxy)-cyclohexane | $1.8 \times 10^5$ | $9.7 \times 10^3$ | $6.5 \times 10^2$ | 90 | 15.6 | 2.8 |
| 1,1-bis-(tert. butyl-peroxy)-2,5-dimethyl-cyclohexane | $4.2 \times 10^5$ | $13.8 \times 10^3$ | $6.3 \times 10^2$ | 39 | 3.0 | 0.2 |
| 2,2-bis-[4,4-di-(tert. butyl-peroxy)-cyclo-hexyl]-propane | $3.9 \times 10^5$ | $16.5 \times 10^3$ | $8.7 \times 10^2$ | 69 | 7.2 | 1.0 |
| Dilauroyl peroxide | $5.9 \times 10^3$ | 288 | 15 | 1.2 | 0.03 | 0.005 |
| Tert.butyl perbenzoate | $1.9 \times 10^6$ | $5.5 \times 10^4$ | $2.9 \times 10^3$ | 290 | 30 | 3.9 |

Example 1.3 mg. of 1,1-bis-(tertiary-butyl-peroxy)-cyclohexane dissolved in 1 ml. of mineral oil was put into an 80 cc. stainless steel autoclave, provided with a magnetic stirrer and a manometer. Thereafter the autoclave was purged with ethylene and the pressure adjusted, the temperature of the autoclave then being raised to 150°–180° C. and the pressure to 1800 kg./cm.² The decrease of pressure during the polymerization reaction was compensated for by the addition of compressed ethylene. The reaction was continued for one hour. 4.3 g. of a spongy polymer were obtained.

Comparative tests were carried out in a similar manner of several other peroxides, using lauroyl peroxide and tertiarybutyl perbenzoate as reference peroxides.

The results are given below in tabular form.

TABLE II

| | Peroxide | Weight of peroxide in mg. | Polymerization temperature, °C. | Yield, g. |
|---|---|---|---|---|
| 1 | 1,1-bis-(tert.butyl-peroxy)-cyclohexane | 1.30 | 150 | 4.3 |
| 2 | do | 1.30 | 180 | 11.1 |
| 3 | 1,1-bis-(tert.butyl-peroxy)-2,5-dimethyl-cyclohexane | 1.45 | 150 | 5.2 |
| 4 | do | 1.45 | 180 | 16.3 |
| 5 | 2,2-bis-[4,4-di-(tert.butyl-peroxy)-cyclohexyl]-propane | 1.40 | 150 | 4.7 |
| 6 | do | 1.40 | 180 | 13.2 |
| 7 | 1,1-bis-(tert.butyl-peroxy)-4-tert.butyl-cyclohexane | 1.60 | 150 | 4.1 |
| 8 | do | 1.60 | 180 | 12.8 |
| 9 | Lauroyl peroxide | 4 | 150 | 0.9 |
| 10 | do | 4 | 180 | 0 |
| 11 | Tert-butylperbenzoate | 2 | 150 | 0.7 |
| 12 | do | 2 | 180 | 3.2 |

While specific examples of preferred methods embodying the present invention have been described above, it will be apparent that many changes and modifications may be made in the details of the methods of procedure without departing from the true spirit of the invention. It will therefore be understood that the particular methods set forth above are intended to be illustrative only, and are not intended to limit the scope of the invention which is defined by the following claims.

What is claimed is:

1. A process for preparing polyalkenes of low density which comprises polymerizing an alkene at a temperature of about 150°–230° C. and a pressure of at least about 500 kg./cm.² in the presence of an initiating quantity of an organic peroxide having the formula

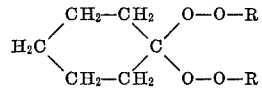

in which at least one hydrogen of the cyclohexyl nucleus may be replaced by a substituent selected from the class consisting of alkyl and cycloalkyl radicals having from 1 to 6 carbon atoms and R is selected from the class consisting of tertiary alkyl and tertiary aralkyl radicals, said peroxide having a half-life time of about one-tenth of the total polymerization time.

2. A process according to claim 1 in which the polymerization is carried out at about 150°–180° C. and about 1800 kg./cm.²

3. A process according to claim 1 in which the initiator is selected from the class consisting of
1,1-bis-(tertiary-butyl-peroxy)-cyclohexane,
1,1-bis-(tertiary-butyl-peroxy)-3-methylcyclohexane,
1,1-bis-(tertiary-butyl-peroxy)-2,5-dimethylcyclohexane,
1,1-bis-(tertiary-butyl-peroxy)-2-cyclohexylhexane
1,1-bis-(tertiary-butyl-peroxy)-4-tertiary-butylcyclohexane.

4. A process according to claim 1 in which the alkene is selected from the class consisting of ethylene, propylene, butylene and mixtures thereof.

References Cited

UNITED STATES PATENTS

| 2,650,913 | 9/1953 | Boyd | 260—94.9 |
| 2,728,756 | 12/1955 | Friedlander | 260—94.9 |
| 2,839,519 | 6/1958 | Seed | 260—94.9 |
| 3,117,166 | 1/1964 | Harrison | 260—610 |
| 3,119,803 | 1/1964 | Horkowitz | 260—94.9 |
| 3,232,921 | 2/1966 | Guillet | 260—94.9 |

JOSEPH L. SCHOFER, Primary Examiner.

M. B. KURTZMAN, Assistant Examiner.

U.S. Cl. X.R.

260—93.7, 94.9

Notice of Adverse Decision in Interference

In Interference No. 97,080 involving Patent No. 3,431,247, N. J. H. Gülpen and H. G. Gerritsen, CHEMICAL PROCESS AND PRODUCTS, final judgment adverse to the patentees was rendered Apr. 26, 1972, as to claims 1 and 3.

[*Official Gazette October 31, 1972.*]